(12) United States Patent
Ombach et al.

(10) Patent No.: US 8,614,532 B2
(45) Date of Patent: Dec. 24, 2013

(54) PERMANENT-MAGNET SYNCHRONOUS MOTOR AND ELECTRIC POWER-ASSISTED STEERING SYSTEM

(75) Inventors: Grzegorz Ombach, Veitschöchheim (DE); Jacek Junak, Veitschöchheim (DE); Horst Steegmueller, Würzburg (DE)

(73) Assignee: Brose Fahrzeugteile GmbH & Co. Kommanditgesellschaft, Wurzburg, Wurzburg (DE)

( * ) Notice: Subject to any disclaimer, the term of this patent is extended or adjusted under 35 U.S.C. 154(b) by 235 days.

(21) Appl. No.: 13/119,013

(22) PCT Filed: Sep. 14, 2009

(86) PCT No.: PCT/DE2009/001275
§ 371 (c)(1),
(2), (4) Date: May 26, 2011

(87) PCT Pub. No.: WO2010/028639
PCT Pub. Date: Mar. 18, 2010

(65) Prior Publication Data
US 2012/0098376 A1 Apr. 26, 2012

(30) Foreign Application Priority Data

Sep. 15, 2008 (DE) .................. 10 2008 042 100

(51) Int. Cl.
*H02K 1/06* (2006.01)
(52) U.S. Cl.
USPC .................. 310/216.099; 310/156.25

(58) Field of Classification Search
USPC ......... 310/216.001–216.137, 156.01–156.84, 310/152
See application file for complete search history.

(56) References Cited

U.S. PATENT DOCUMENTS

| | | | |
|---|---|---|---|
| 6,483,221 B1 * | 11/2002 | Pawellek et al. | 310/216.064 |
| 6,822,364 B2 * | 11/2004 | Suzuki et al. | 310/216.012 |
| 7,034,423 B2 * | 4/2006 | Crapo et al. | 310/152 |
| 7,528,519 B2 * | 5/2009 | Miyashita | 310/216.001 |
| 2003/0011272 A1 * | 1/2003 | Kataoka et al. | 310/254 |
| 2006/0214533 A1 * | 9/2006 | Miyashita et al. | 310/216 |

FOREIGN PATENT DOCUMENTS

| | | |
|---|---|---|
| DE | 198 42 948 A1 | 3/2000 |
| DE | 101 47 073 A1 | 4/2003 |
| EP | 0 952 658 A2 | 10/1999 |
| EP | 1 542 335 A | 6/2005 |
| EP | 1 677 409 A2 | 7/2006 |

(Continued)

*Primary Examiner* — Nguyen N Hanh
(74) *Attorney, Agent, or Firm* — Fulbright & Jaworski, LLP; Erik G. Swenson

(57) ABSTRACT

The present invention relates to a permanent-magnet synchronous motor, particularly an electric three-phase motor, comprising a stator having a stator yoke in which stator teeth with interposed stator grooves are arranged, wherein on each stator tooth at least one winding is provided, further comprising a rotor having permanent magnets, wherein the stator teeth are arranged in layers as disks in the axial direction of the stator and designed at least as two different disks, wherein the stator teeth in a first disk are connected peripherally among each other at the ends thereof pointing toward the rotor in the form of a stator star by a connecting bridge and in a second disk have an interruption instead of the connecting bridge. The present invention further relates to an electric power-assisted steering system.

11 Claims, 9 Drawing Sheets

(56) References Cited

FOREIGN PATENT DOCUMENTS

| | | |
|---|---|---|
| EP | 1 770 847 A | 4/2007 |
| EP | 1 968 081 A1 | 9/2008 |
| JP | 2007 151232 A | 6/2007 |
| WO | WO 2006/100548 | 9/2006 |

\* cited by examiner

PERMANENT-MAGNET SYNCHRONOUS MOTOR AND ELECTRIC POWER-ASSISTED STEERING SYSTEM

FIELD OF THE INVENTION

The present invention relates to a permanent-magnet synchronous motor, in particular an electric three-phase motor. The present invention further relates to an electric power-assisted steering system for a motor vehicle.

BACKGROUND OF THE INVENTION

Permanent-magnet synchronous motors of this type are used for example in drive means of motor vehicles, in particular in power-assisted steering systems and the like.

FIG. 1a-c show generally known power-assisted steering systems by way of example. FIG. 1a shows a power-assisted steering system of a motor vehicle having wheels 106 which are steerably connected via a track rod 107. The track rod 107 cooperates with a steering gear 101, which in this case comprises a toothed rod (merely indicated symbolically by a double-headed arrow) which is connected to a pinion 105. The pinion 105 is rotatably coupled to a steering wheel via a steering shaft 102. A steering drive 103 in the configuration of an electric three-phase motor having a control unit 104 is attached to the steering gear 101, and assists in steering processes by cooperating with the toothed rod. FIG. 1b shows a power-assisted steering system similar to FIG. 1a, in which the steering drive 103 cooperates assistively with the steering shaft 102. The steering drive 103 may be attached to a steering column for this purpose. FIG. 1c likewise shows a power-assisted steering system similar to FIGS. 1a and 1b. In this configuration, the steering drive 103 is shown in cooperation with the pinion 105, and can also be arranged on the steering gear 101.

FIG. 2 is a schematic plan view of a permanent-magnet synchronous motor which is currently used as a steering drive 103 and which comprises: a stator 201 having grooves 202 in which windings (not shown) are arranged; and a rotor 204 having permanent magnets 203 which in the present case are arranged inside the rotor 204 on the circumference thereof in the axial direction of the motor. The rotor 204 is located inside the stator 201.

A motor of this type has to meet two main criteria, namely efficiency and safety. Parameters such as power intensity, maximum output torque, torque fluctuation or undulation, and detent torque or intermittent torque are of significance for the efficiency. The following parameters are of great importance for safety: maximum braking torque, short-circuit capacity, fault tolerance and simplicity.

The increased requirements on the conditions of use in a motor vehicle, in particular as regards a minimal constructional volume, weight, and number of individual parts used and a simultaneous high efficiency, and the above-mentioned parameters result in a constant requirement to provide a correspondingly improved permanent-magnet synchronous motor.

SUMMARY OF THE INVENTION

Against this background, the object of the present invention is therefore to provide an improved permanent-magnet synchronous motor.

This object is achieved according to the invention by a permanent-magnet synchronous motor having the features of claim 1 and/or by an electric power-assisted steering system having the features of claim 11.

Accordingly, a permanent-magnet synchronous motor is provided, in particular an electric three-phase motor, comprising a rotor having permanent magnets, comprising a stator having a stator yoke in which stator teeth with interposed stator grooves are arranged, at least one winding being provided on each stator tooth, the stator teeth being arranged in layers as plates in the axial direction of the stator and constructed as at least two different plates, the stator teeth in a first plate being peripherally interconnected at the ends thereof pointed towards the rotor in the form of a stator star by a connecting bridge in each case, and the stator teeth in a second plate having an interruption instead of the connecting bridge.

A permanent-magnet synchronous motor of this type thus has the advantages of very low detent torque combined with high efficiency and simultaneously low torque undulation.

A further advantage is that the permanent-magnet synchronous motor according to the invention has a lower braking torque than conventional permanent-magnet synchronous motors, and this can be as much as 50% lower.

At the same time, in this way a start relay can also be dispensed with, since the braking torques end up being lower.

The disclosed permanent-magnet synchronous motor is preferably adapted for the drive means of a motor vehicle power-assisted steering system. However, other applications in other drive means are also conceivable.

Advantageous configurations and developments of the invention are apparent from the dependent claims and from the description in conjunction with the figures of the drawings.

The stator teeth can be arranged as plates in the axial direction of the stator in the sequence of a stator star having connecting bridges followed by a plate of stator teeth without connections. An arrangement in the sequence of a stator star having connecting bridges followed by two or three plates of stator teeth without connections is also possible. In this case, the arrangement in the sequence of a stator star having connecting bridges followed by two plates of stator teeth without connections is particularly preferred, and provides the advantage of high efficiency with a simultaneous scope for safety.

In a further preferred embodiment, at least one insulation is provided in each case between the windings in the stator grooves. This reduces the probability of insulation faults.

The windings may be arranged in a three-phase star circuit or in a three-phase triangle circuit. This results in a very low braking torque by comparison with conventional motors in the case of faulty insulation. The triangle circuit further has the advantage that the connection points are reduced by comparison with the star circuit, star circuits being required for conventional permanent-magnet synchronous motors having start relays.

The rotor may variously be formed with permanent magnets in recesses on the circumference thereof or circumferentially on the surface thereof or with ring magnets.

In a further embodiment, the rotor may comprise at least two rotor packets which are arranged in the axial direction thereof, the at least two rotor packets being arranged rotated from one another by an offset angle γ about a rotor axis. If there are more than two rotor packets, the offset angle γ is the angle between the first and last rotor packet. In this case, the number n of rotor packets depends on an active axial length Lstk of the permanent-magnet synchronous motor as follows: n=1 or 2 if Lstk≤40 mm; n=2 or 3 if 40≤Lstk≤60 mm; n=3 or 4 if 60≤Lstk≤80 mm; and n=4 if 80≤Lstk≤130 mm. The active axial length Lstk means the axial length of the stator including the rotor.

It is expedient for the offset angle γ to be less than or equal to half of a number of stator grooves.

In preferred embodiments, the permanent-magnet synchronous motor comprises twelve stator grooves and eight pole pairs, twelve stator grooves and ten pole pairs, or twelve stator grooves and fourteen pole pairs.

By comparison with a conventional permanent-magnet synchronous motor, the permanent-magnet synchronous motor according to the invention also has inter alia the following advantages:
- efficiency increased by approximately 10%;
- braking torque reduced by approximately 50%;
- increased motor inductivity for low currents;
- reduced detent torque;
- reduced torque undulation;
- no relay required;
- triangle circuit can be used;
- outstanding winding/phase insulation;
- simpler stator construction;
- simpler rotor construction.

The above configurations and developments of the invention can be combined in any desired manner.

BRIEF DESCRIPTION OF THE DRAWINGS

The present invention is described in greater detail in the following by way of the embodiments illustrated in the schematic figures of the drawings, in which.

DETAILED DESCRIPTIONS OF PREFERRED EMBODIMENTS

Figure 1A:
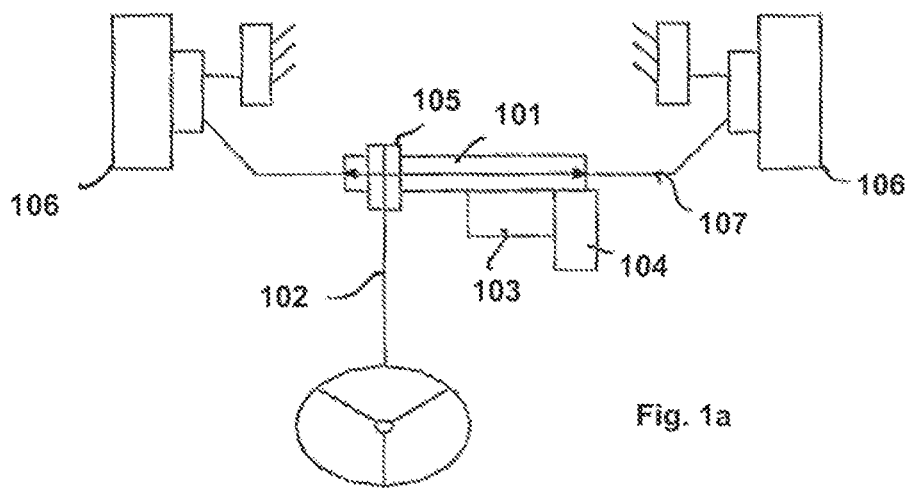
FIG. 1a-c are schematic drawings of power-assisted steering systems having steering drives in different installation positions.
Figure 1B:
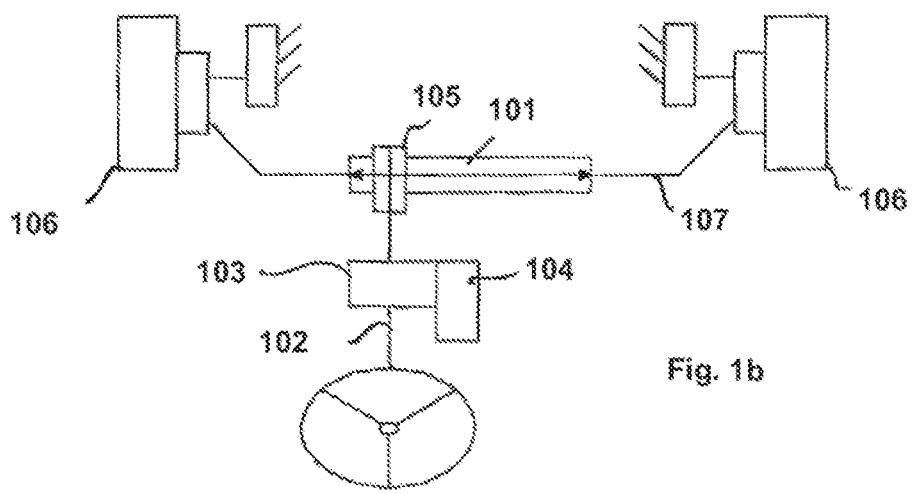
Figure 1C:
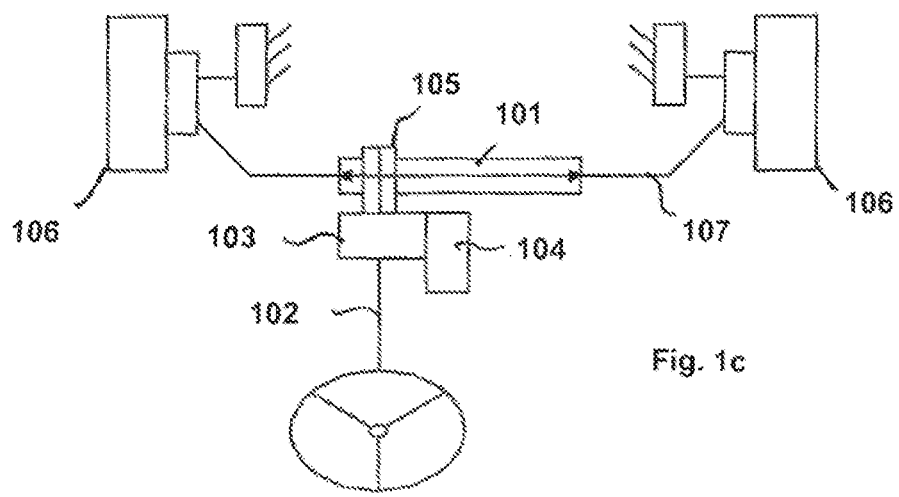
Figure 2:
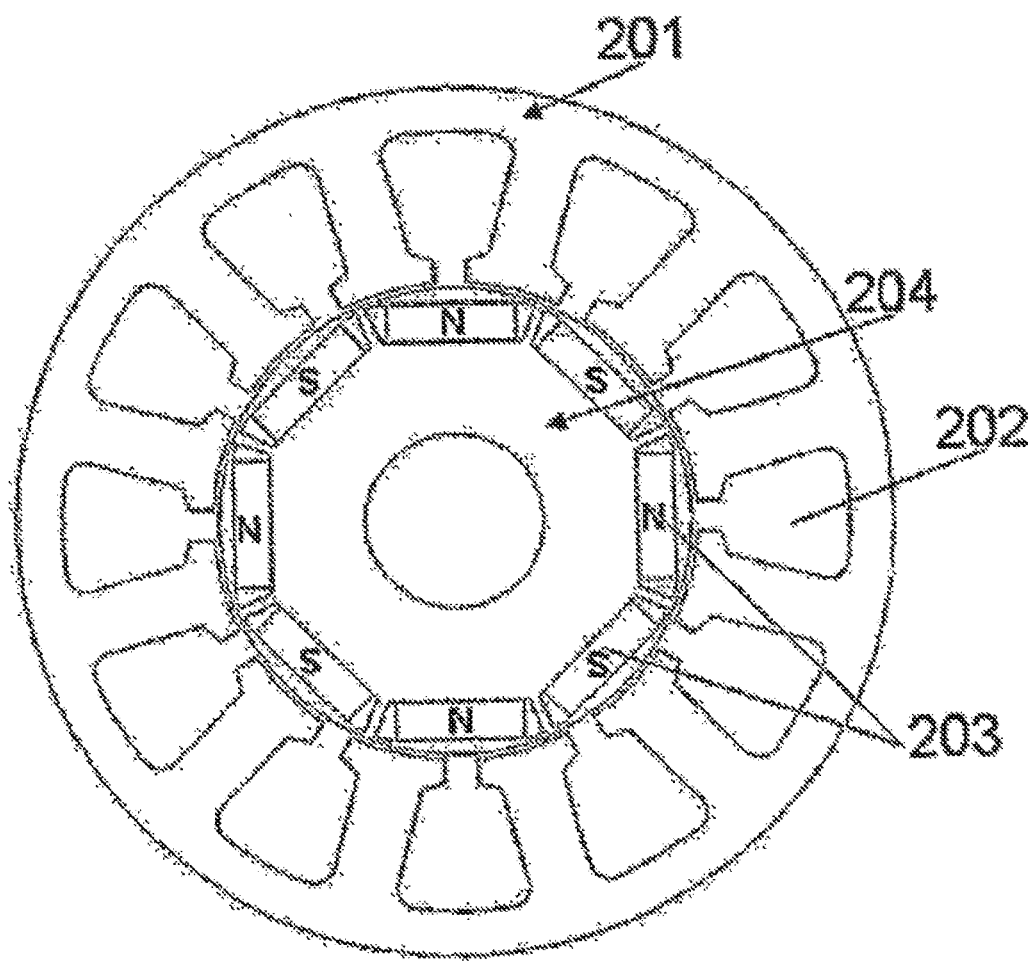
FIG. 2 is a schematic plan view of a permanent-magnet synchronous motor.

In the figures of the drawing, like and functionally identical components and features have been provided with the same reference numerals unless otherwise indicated.

The power-assisted steering systems and basic construction of a permanent-magnet synchronous motor have already been explained in the above referring to FIG. 1a-c and FIG. 2.

Figure 3:
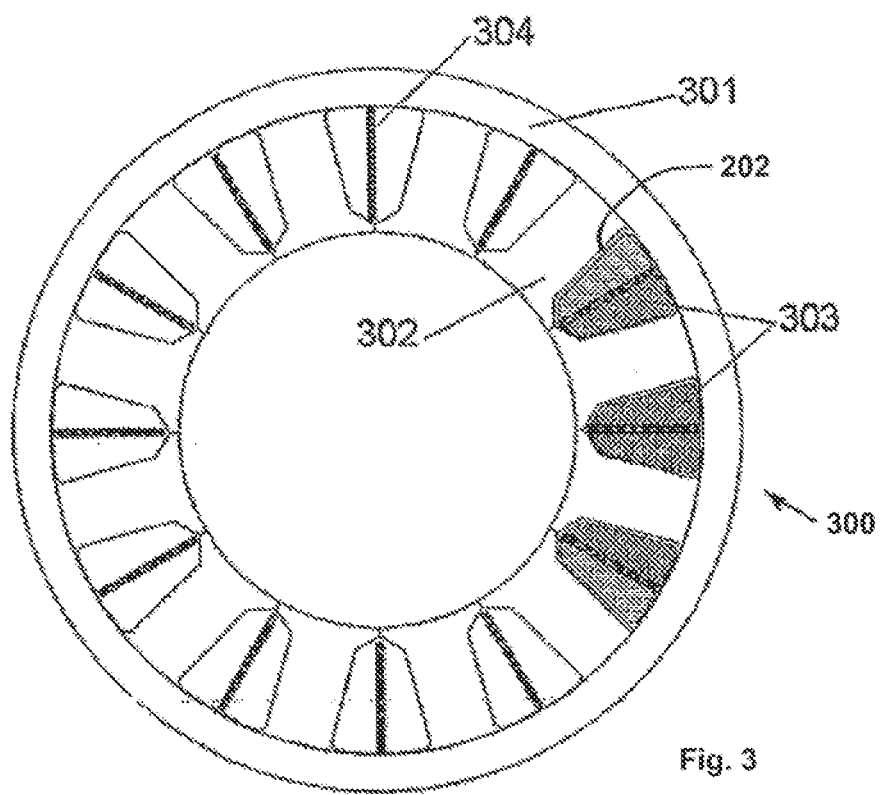
FIG. 3 is a schematic plan view of a stator of an embodiment of a permanent-magnet synchronous motor according to the invention.

FIG. 3 is a schematic plan view of a stator 300 of an embodiment of a permanent-magnet synchronous motor according to the invention having a stator yoke 301 in which stator teeth 302 are arranged circumferentially on the inner circumference of the stator yoke 301. Stator grooves 202, in which windings 303 are arranged around the stator teeth 302, are located between the stator teeth 302. The windings 303 are additionally insulated from one another in the stator grooves 202 by an insulation 304. The ends of the stator teeth 302 pointing towards the centre of the stator yoke 301 are widened in such a way that the stator grooves 202 are radially surrounded internally by these widenings and externally by the stator yoke 301.

Figure 4:
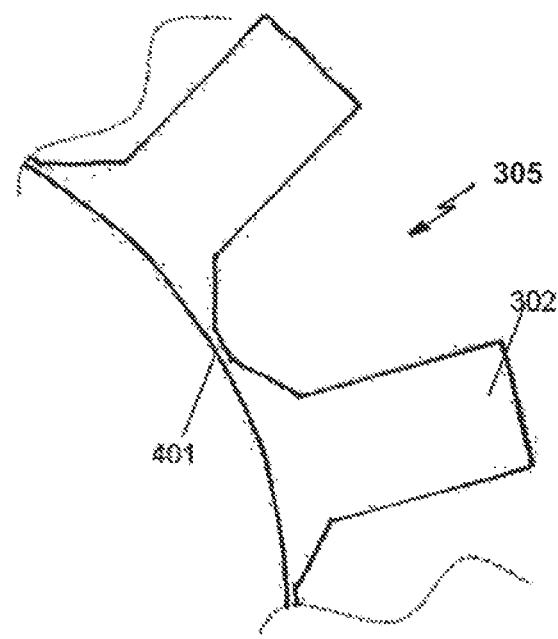
FIG. 4 is an enlarged schematic plan view of a sub portion of stator teeth of the permanent-magnet synchronous motor according to the invention according to FIG. 3.

FIG. 4 is an enlarged schematic plan view of a partial portion of the stator teeth 302 of the permanent-magnet synchronous motor according to the invention according to FIG. 3. In this example, the stator teeth 302 are formed as plates which are layered on top of one another in the axial direction of the stator 300. These plates may have at least two different forms. FIG. 4 shows a first form in the configuration of a stator star 305. In this case, the widened ends of the stator teeth 302 are each connected circumferentially via a connecting bridge 401.

Figure 5:
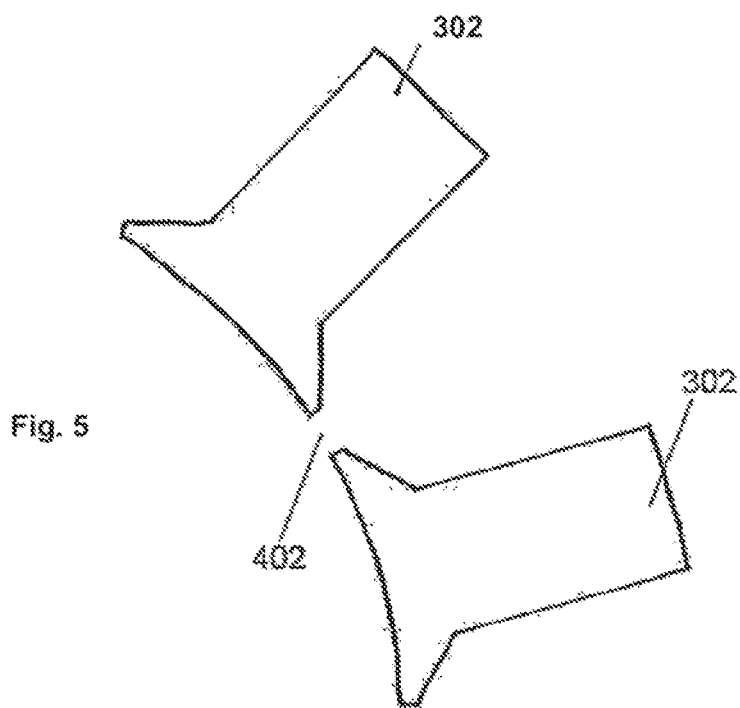
FIG. 5 is an enlarged schematic plan view of individual stator teeth of the permanent-magnet synchronous motor according to the invention according to FIG. 3.
Figure 6:
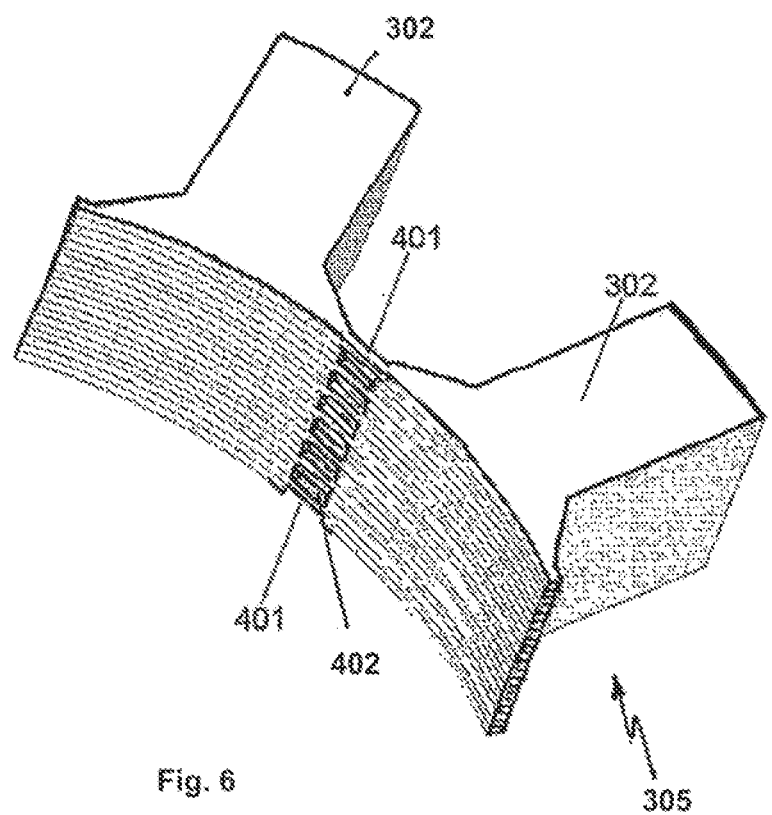
FIG. 6 is an enlarged schematic perspective view of stator stars and stator teeth of the permanent-magnet synchronous motor according to the invention according to FIG. 3.

FIG. 5 shows a second form of these plates, the widened ends of the stator teeth 302 having an interruption 402 instead of being connected. They are thus individual teeth. In the above-mentioned layered construction in the axial direction, these plates are arranged layered alternately on top of one another, as is shown in FIG. 6 in a perspective view by way of example. In this case, the connecting bridges 401 and interruptions 402 alternate. Further arrangements are also possible, such as two or three plates with interruptions 402 between two connecting bridges 401. Further combinations are of course conceivable.

Figure 7:
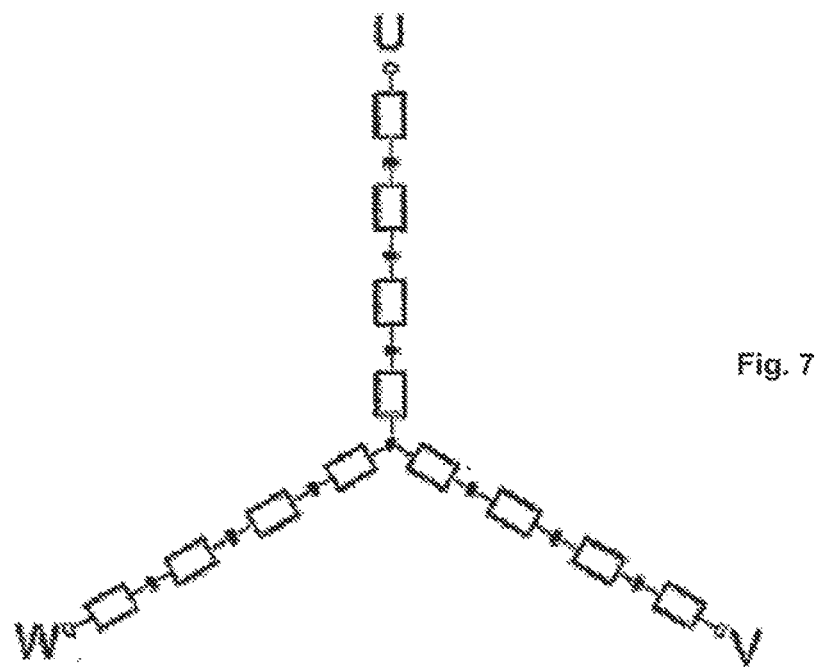
FIGS. 7 to 8 are circuit diagrams of windings of the permanent-magnet synchronous motor according to the invention according to FIG. 3.
Figure 8:
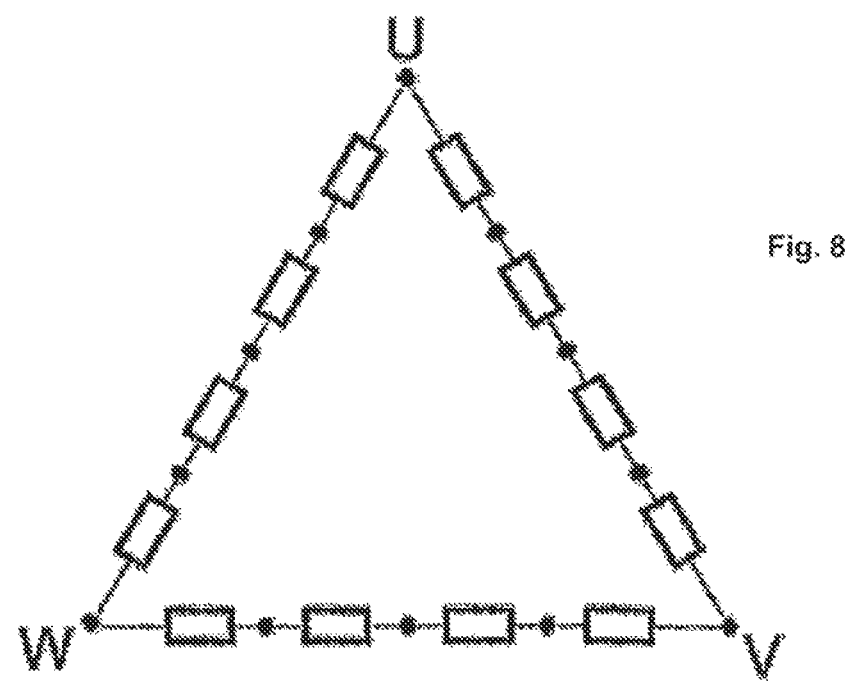

FIGS. 7 and 8 are circuit diagrams of windings of the permanent-magnet synchronous motor according to the invention, both a conventional star circuit according to FIG. 7 and a triangle circuit according to FIG. 8 being possible. In this case, the triangle circuit has the advantage that only three terminals U, V, W are required because there is no star terminal or star connection for the star circuit.

Figure 9:
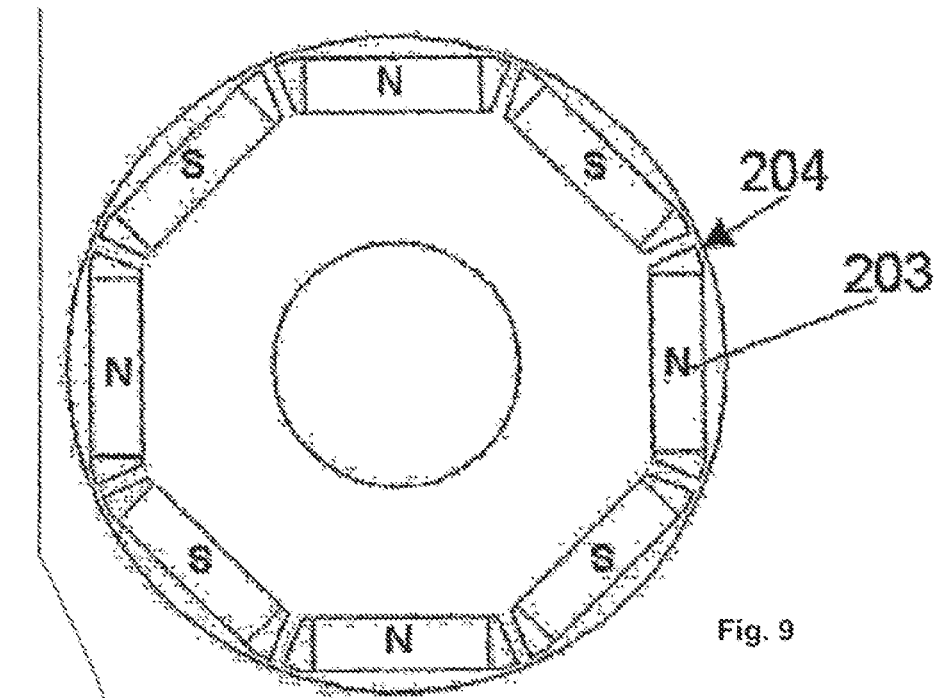
FIGS. 9 to 11 are schematic plan views of three embodiments of a rotor of the permanent-magnet synchronous motor according to the invention according to FIG. 3.
Figure 10:
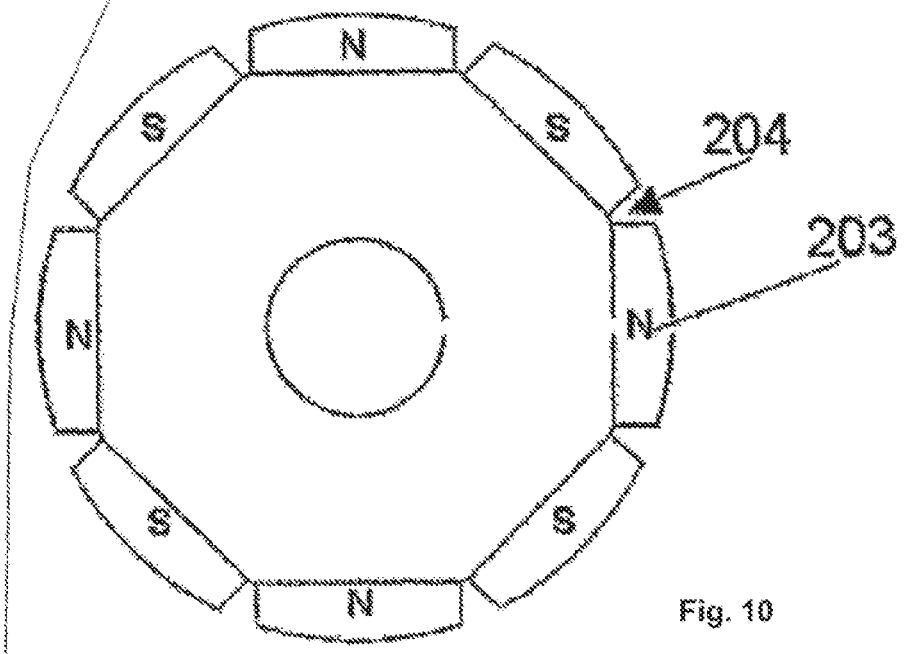
Figure 11:
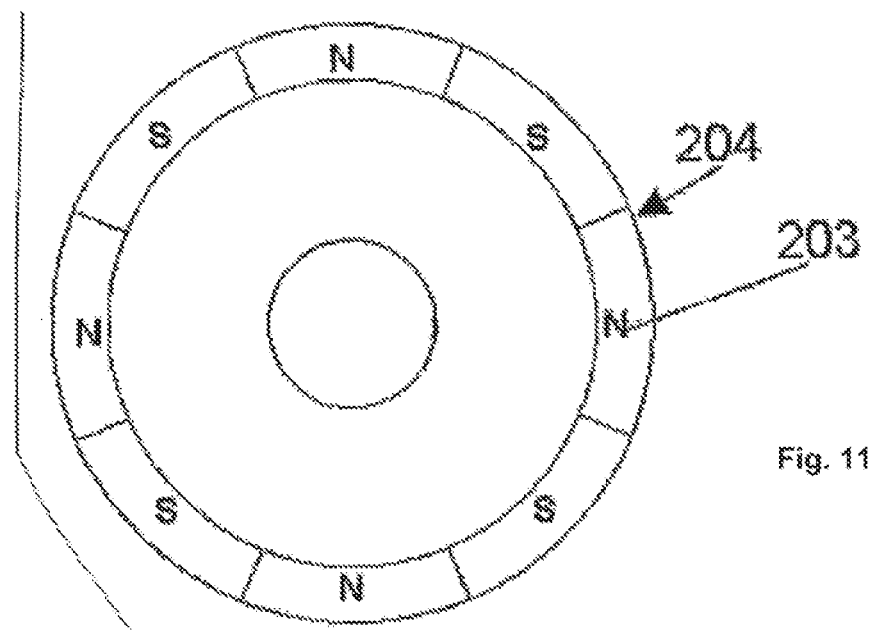

FIGS. 9 to 11 are schematic plan views of three embodiments of a rotor 204 of the permanent-magnet synchronous motor according to the invention according to FIG. 3. FIG. 9 shows permanent magnets 203 arranged on the circumference of the rotor 204 in recesses and having different polarity N, S in the axial direction of the rotor 204. FIG. 10 shows an arrangement of the permanent magnets 203 on the outer circumferential surface of the rotor 204, and FIG. 11 shows annular magnets on the outer circumferential surface of the rotor 204.

Figure 12:
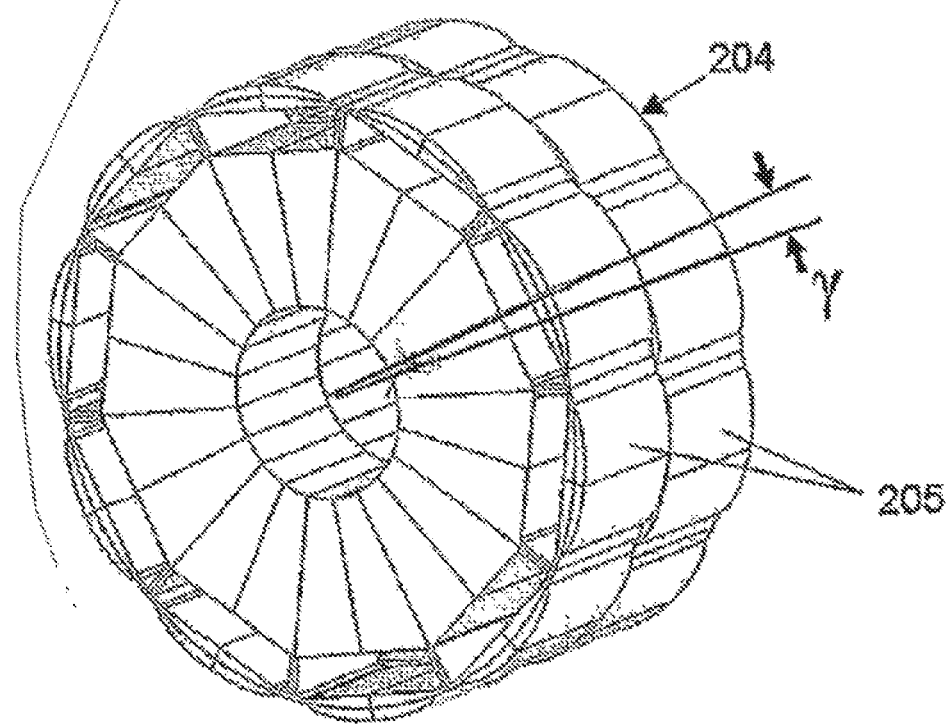
FIG. 12 is a schematic perspective view of a fourth embodiment of the rotor of the permanent-magnet synchronous motor according to the invention according to FIG. 3.
Figure 13:
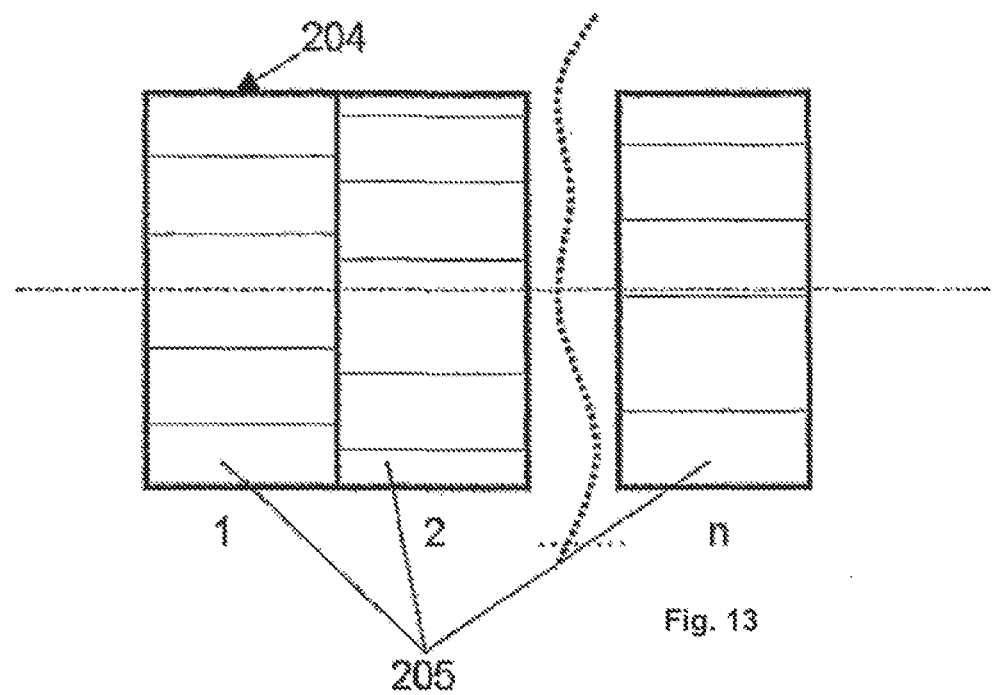
FIG. 13 is a schematic side view of the fourth embodiment of the rotor according to FIG. 12.

FIG. 12 is a schematic perspective view of a fourth embodiment of the rotor of the permanent-magnet synchronous motor according to the invention according to FIG. 3. In this case, the rotor 204 consists of two rotor packets 205 arranged in succession in the axial direction and rotated relative to one another about the axial direction by an offset angle γ, which is preferably half of the number of stator grooves. If the number of rotor packers 205 is more than two, as shown in FIG. 13, the offset angle γ is the angle between the first and last rotor packets 205.

Figure 14:
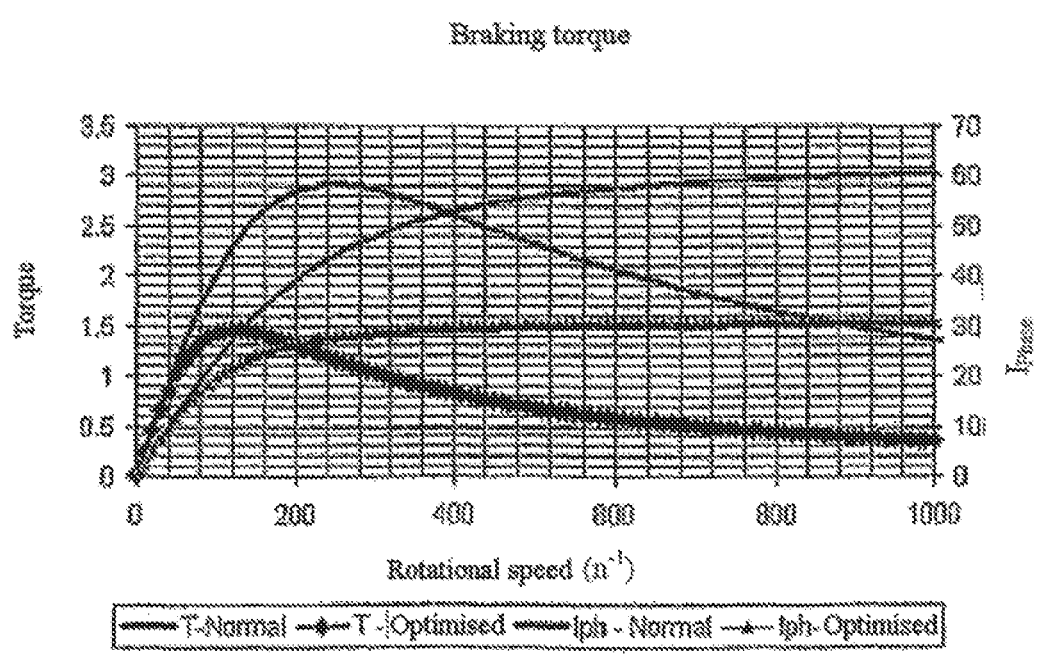
FIG. 14 is a graph of the braking torque against the rotational speed of the permanent-magnet synchronous motor according to the invention according to FIG. 3 by comparison with a conventional permanent-magnet synchronous motor.
Figure 15:
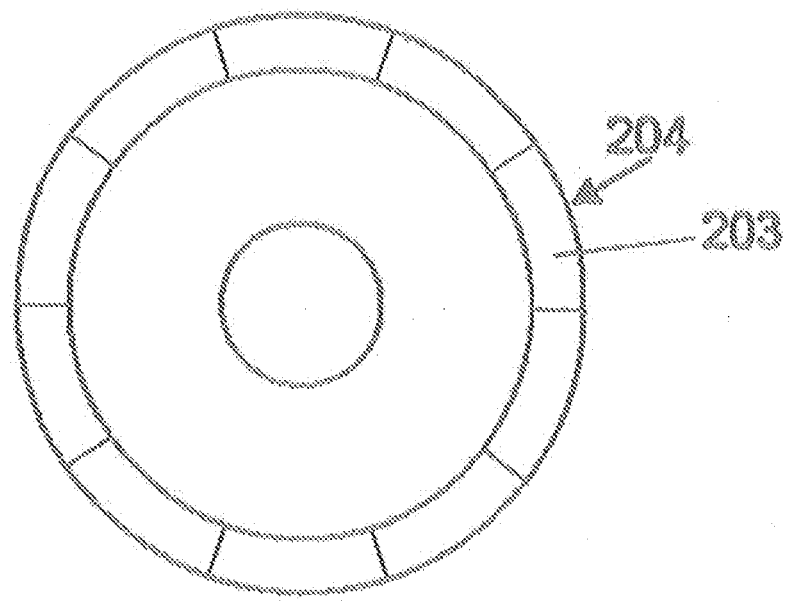
FIGS. 15 and 16 are schematic view of two further examples of a rotor of the permanent-magnet synchronous motor according to the invention according to FIG. 3.
Figure 16:
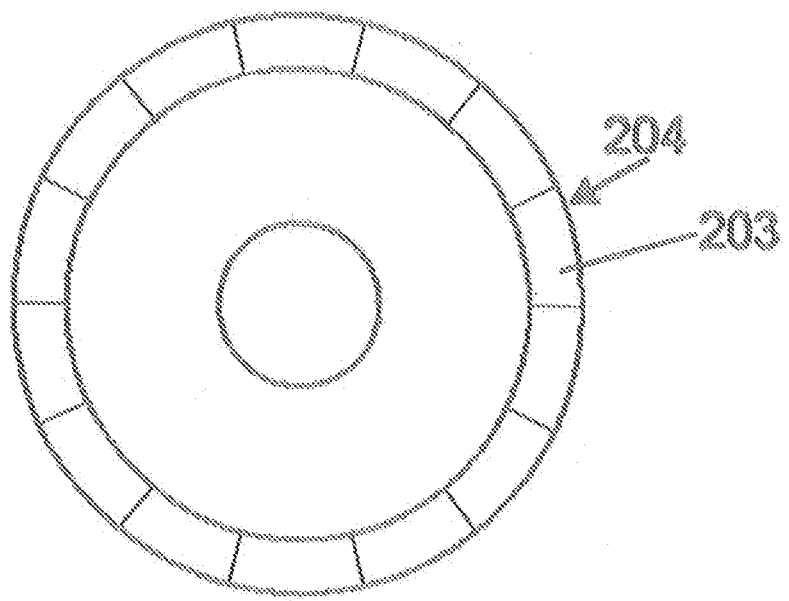

FIG. 14 is a graph comparing the braking torque of the permanent-magnet synchronous motor according to the invention according to FIG. 3 with that of a conventional permanent-magnet synchronous motor against the rotational speed. The y-coordinates on the left-hand side represent torque, and those on the right-hand side represent phase current $I_{Phase}$. The upper curve drawn as a thick line represents the normal braking torque of a conventional permanent-magnet synchronous motor, which reaches a maximum at a rotational speed of 220 $n^{-1}$, whilst an optimised torque of the permanent-magnet synchronous motor according to the invention reaches a maximum at 60 $n^{-1}$, and this maximum is approximately 50% lower than that of the conventional permanent-magnet synchronous motor. The normal phase current $I_{Phase}$ is shown as a thin upper line, whilst the optimised phase current $I_{Phase}$ of the permanent-magnet synchronous motor according to the invention reaches a maximum approximately 50% lower than that of the conventional permanent-magnet synchronous motor. From these test results, it will be appreciated that the permanent-magnet synchronous motor according to the invention provides greater safety than a conventional motor at a lower braking torque, in that in a possible accident, for example in the case of a power-assisted steering system, the steering is not locked by an excessively high braking torque. The lower current uptake of the permanent-magnet synchronous motor according to the invention makes a lower energy consumption possible.

The use of the permanent-magnet synchronous motor according to the invention in a power-assisted steering system of a motor vehicle may also be used on the steering gear 101, on the steering shaft 102, on the pinion 105 or alternatively at another point with appropriate couplings.

Although the present invention has been described in the above by way of a preferred embodiment, it is not to be restricted to this embodiment, and can be modified in any desired manner without departing from the subject-matter of the present invention.

In particular, it would also be conceivable for the stator teeth 302 to have connecting bridges 401 and interruptions 402 in the same plate plane, in a third plate form.

The application of the permanent-magnet synchronous motor according to the invention in a drive device in a motor vehicle, and in this context in particular for a power-assisted steering system of a motor vehicle, should also be taken merely as an example. The invention can in fact be used advantageously in any desired electric drives.

The numbers given in the above are indeed preferred and are in some cases derived from a specific application, but they can also be varied to a greater or lesser extent in accordance with the activities and knowledge of the person skilled in the art.

| List of reference numerals | |
| --- | --- |
| 101 | steering gear |
| 102 | steering shaft |
| 103 | motor |
| 104 | control unit |
| 105 | pinion |
| 106 | wheel |
| 107 | track rod |
| 201 | stator |
| 202 | stator groove |
| 203 | permanent magnet |
| 204 | rotor |
| 205 | rotor packet |
| 301 | stator yoke |
| 302 | stator tooth |
| 303 | winding |
| 304 | insulation |
| 305 | stator star |
| 401 | connecting bridge |
| 402 | interruption |
| N, S | magnet poles |
| U, V, W | terminal |
| Y | offset angle |

The invention claimed is:

1. A permanent-magnet synchronous motor, comprising:
   a rotor having permanent magnets; and
   a stator having a stator yoke in which stator teeth with interposed stator grooves are arranged, wherein:
   at least one winding is provided on each stator tooth;
   the stator teeth being arranged in layers as plates in the axial direction of the stator and constructed as at least two different plates;
   the stator teeth in a first plate being peripherally interconnected at the ends thereof pointed towards the rotor in the form of a stator star by a connecting bridge in each case; and
   the stator teeth in a second plate having an interruption instead of the connecting bridge,
   wherein the stator teeth are arranged as plates in the axial direction of the stator in the sequence of a stator star having connecting bridges followed by at least one plate of stator teeth without connections;
   wherein the rotor comprises at least two rotor packets which are arranged in the axial direction of the rotor the at least two rotor packets being arranged rotated from one another by an offset angle about a rotor axis; and
   wherein the offset angle is less than or equal to half of a number of stator grooves, the offset angle being the angle between the first and last rotor packets if there are more than two rotor packets.

2. The motor according to claim 1, wherein the stator teeth are arranged as plates in the axial direction of the stator in the sequence of a stator star having connecting bridges followed by one plate of stator teeth without connections.

3. The motor according to claim 1, wherein the stator teeth are arranged as plates in the axial direction of the stator in the sequence of a stator star having connecting bridges followed by two plates of stator teeth without connections.

4. The motor according to claim 1, wherein the stator teeth are arranged as plates in the axial direction of the stator in the sequence of a stator star having connecting bridges followed by three plates of stator teeth without connections.

5. The motor according to claim 1, wherein at least one insulation is provided in each case between the windings in the stator grooves.

6. The motor according to claim 1, wherein the windings are arranged in a three-phase star circuit or in a three-phase triangle circuit.

7. The motor according to claim 1, wherein the rotor comprises permanent magnets formed in recesses on the circumference thereof, circumferentially on the surface thereof or as ring magnets.

8. The motor according to claim 1, wherein a number n of rotor packets depends on an active axial length Lstk of the permanent-magnet synchronous motor as follows:

n=1 or 2 if Lstk≤40 mm;
n=2 or 3 if 40≤Lstk≤60 mm;
n=3 or 4 if 60≤Lstk≤80 mm;
n=4 if 80≤Lstk≤130 mm.

9. The motor according to claim 1, wherein the permanent-magnet synchronous motor comprises twelve stator grooves and eight pole pairs or twelve stator grooves and ten pole pairs or twelve stator grooves and fourteen pole pairs.

10. The motor according to claim 1, wherein the permanent-magnet synchronous motor is an electric three-phase motor.

11. An electric power-assisted steering system of a motor vehicle, which comprises a permanent-magnet synchronous motor comprising:

a rotor having permanent magnets;
a stator having a stator yoke in which stator teeth with interposed stator grooves are arranged;
at least one winding provided on each stator tooth;
the stator teeth are arranged in layers as plates in the axial direction of the stator and constructed as at least two different plates; and
the stator teeth in a first plate being peripherally interconnected at the ends thereof pointed towards the rotor in the form of a stator star by a connecting bridge in each case; and
the stator teeth in a second plate having an interruption instead of the connecting bridge,
wherein the stator teeth are arranged as plates in the axial direction of the stator in the sequence of a stator star having connecting bridges followed by at least one plate of stator teeth without connections;
wherein the rotor comprises at least two rotor packets which are arranged in the axial direction of the rotor, the at least two rotor packets being arranged rotated from one another by an offset angle about a rotor axis; and
wherein the offset angle is less than or equal to half of a number of stator grooves, the offset angle being the angle between the first and last rotor packets if there are more than two rotor packets.

* * * * *